US006674970B1

(12) United States Patent
Anderson

(10) Patent No.: US 6,674,970 B1
(45) **Date of Patent: *Jan. 6, 2004**

(54) PLASMA ANTENNA WITH TWO-FLUID IONIZATION CURRENT

(75) Inventor: Theodore R. Anderson, West Greenwich, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,085

(22) Filed: May 21, 1999

(51) Int. Cl.[7] .......................... H01Q 1/26; H01Q 1/34; H04B 10/00; H04B 10/04; H01J 7/24

(52) U.S. Cl. ...................... 398/121; 343/701; 343/709; 343/850; 315/111.21; 315/111.41; 398/183; 398/186

(58) Field of Search ......................... 359/172; 343/701, 343/709, 850; 315/111.21, 111.41; 372/7

(56) References Cited

U.S. PATENT DOCUMENTS 3,719,829 A * 3/1973 Vaill .......................... 307/149
3,886,402 A * 5/1975 Furthe et al. ........... 315/111.71
3,914,766 A * 10/1975 Moore ........................ 343/701
5,107,510 A * 4/1992 Seguin et al. ................. 372/25
5,990,837 A * 11/1999 Norris et al. ............... 343/701
6,087,993 A * 7/2000 Anderson et al. ........... 343/701

FOREIGN PATENT DOCUMENTS

JP 3-48474 * 3/1991
JP 6-104514 * 4/1994

OTHER PUBLICATIONS

Timothy J. Dwyer et al., ON the Feasibility of Using an Atmospheric Discharge Plasma as an RF Antenna, IEEE Transactions on antennas and propagation vol. AP–32, No. 2, Feb. 1984.*

Alexeff, I, Kang et al., “A Plasma stealth antenna for the US Navy” IEEE Conference Record Abstract 19 IEEE International on Jun. 1–4, 1998.*

* cited by examiner

*Primary Examiner*—Jason Chan
*Assistant Examiner*—M. R. Sedighian
(74) *Attorney, Agent, or Firm*—James M. Kasischke; Michael F. Oglo; Jean-Paul A. Nasser

(57) ABSTRACT

A plasma antenna is provided having an ionizer, which when energized, generates a bounded or unbounded plasma column extending along a vertical axis. When ionization is initiated, the difference in the diffusion characteristics of ions and electrons and the resulting gas plasma produce a current pulse in a first direction. As the plasma extinguishes, the difference in relaxation times for the ions and electrons in the plasma produces a second current pulse of opposite direction. The alternating current pulses generate an electric field that radiates from the plasma column.

14 Claims, 3 Drawing Sheets

PLASMA ANTENNA WITH TWO-FLUID IONIZATION CURRENT

CROSS REFERENCES TO RELATED PATENT APPLICATION

The instant application is related to two U.S. patent applications entitled STANDING WAVE PLASMA ANTENNA WITH PLASMA REFLECTOR Ser. No. 08/317,084 filed May 21, 1999 and now U.S. Pat. No. 6,046,705 granted Apr. 4, 2000; and PLASMA ANTENNA WITH ELECTRO-OPTICAL MODULATOR Ser. No. 08/317,086 filed May 21, 1999 and now U.S. Pat. No. 6,087,993 granted Jul. 11, 2000.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to communications antennas, and more particularly to plasma antennas adaptable for use in any of a wide range of frequencies (2) Description of the Prior Art A specific antenna typically is designed to operate over a narrow band of frequencies. However, the underlying antenna configuration or design may be adapted or scaled for widely divergent frequencies. For example, a simple dipole antenna design may be scaled to operate at frequencies from the 3–4 MHz band up to the 100 MHz band and beyond.

At lower frequencies the options for antennas become fewer because the wavelengths become very long. Yet there is a significant interest in providing antennas for such lower frequencies including the Extremely Low Frequency (ELF) band, that is less than 3 kHz, the Very Low Frequency (VLF) band including signals from 20 kHz to 60 kHz and the Low Frequency (LF) band with frequencies in the 90 to 100 kHz band. However, conventional half-wave and quarter-wave antenna designs are difficult to implement because at 100 Hz, for example, a quarter-wave length is of the order of 750 km.

Notwithstanding these difficulties, antennas for such frequencies are important because they are useful in specific applications, such as effective communications with a submerged submarine. For such applications, conventional ELF antennas comprise extremely long, horizontal wires extended over large land areas. Such antennas are expensive to construct and practically impossible to relocate at will. An alternative experimental Vertical Electric Dipole (VEP) antenna uses a balloon to raise one end of a wire into the atmosphere to a height of up to 12 km or more. Such an antenna can be relocated.

To be truly effective the antenna should extend along a straight line. Winds, however, can deflect both the balloon and wire to produce a catenary form that degrades antenna performance. Other efforts have been directed to the development of a corona mode antenna. This antenna utilizes the corona discharges of a long wire to radiate ELF signals.

Still other current communication methods for such submarine and other underwater environments include the use of mast mounted antennas, towed buoys and towed submersed arrays. While each of these methods has merits, each presents problems for use in an underwater environment. The mast of current underwater vehicles performs numerous sensing and optical functions. Mast mounted antenna systems occupy valuable space on the mast which could be used for other purposes. Consequently, as a practical matter, the use of such antennas for ELF or other low frequency communications is not possible because they require too much space. For both towed buoys and towed submersed arrays, speed must be decreased to operate the equipment.

Conventional plasma antennas are of interest for communications with underwater vessels since the frequency, pattern and magnitude of the radiated signals are proportional to the rate at which the ions and electrons are displaced. The displacement and hence the radiated signal can be controlled by a number of factors including plasma density, tube geometry, gas type, current distribution, applied magnetic field and applied current. This allows the antenna to be physically small, in comparison with traditional antennas. Studies have been performed for characterizing electromagnetic wave propagation in plasmas. Therefore, the basic concepts, albeit for significantly different applications, have been investigated.

With respect to plasma antennas, U.S. Pat. No. 1,309,031 to Hettinger discloses an aerial conductor for wireless signaling and other purposes. The antenna produces, by various means, a volume of ionized atmosphere along a long beam axis to render the surrounding atmosphere more conductive than the more remote portions of the atmosphere. A signal generating circuit produces an output through a discharge or equivalent process that is distributed over the conductor that the ionized beam defines and that radiates therefrom.

U.S. Pat. No. 3,404,403 to Vellase et al. uses a high power laser for producing the laser beam. Controls repeatedly i pulse and focus the laser at different points thereby to ionize a column of air. Like the Hettinger patent, a signal is coupled onto the ionized beam.

U.S. Pat. No. 3,719,829 to Vaill discloses an antenna constructed with a laser source that establishes an ionized column. Improved ionization is provided by means of an auxiliary source that produces a high voltage field to increase the initial ionization to a high level to form a more highly conductive path over which useful amounts of electrical energy can be conducted for the transmission of intelligence or power. In the Hettinger, Vellase et al. and Vaill patents, the ionized columns merely form vertical conductive paths for a signal being transmitted onto the path for radiation from that path.

U.S. Pat. No. 3,914,766 to Moore discloses a pulsating plasma antenna, which has a cylindrical plasma column and a pair of field exciter members parallel to the column. The location and shape of the exciters, combined with the cylindrical configuration and natural resonant frequency of the plasma column, enhance the natural resonant frequency of the plasma column, enhance the energy transfer and stabilize the motion of the plasma so as to prevent unwanted oscillations and unwanted plasma waves from destroying the plasma confinement.

U.S. Pat. No. 5,594,456 to Norris et al. discloses an antenna device for transmitting a short pulse duration signal of predetermined radio frequency. The antenna device includes a gas filled tube, a voltage source for developing an electrically conductive path along a length of the tube which corresponds to a resonant wavelength multiple of the predetermined radio frequency and a signal transmission source coupled to the tube which supplies the radio frequency signal. The antenna transmits the short pulse duration signal in a manner that eliminates a trailing antenna resonance signal. However, as with the Moore antenna, the band of frequencies at which the antenna operates is limited since the tube length is a function of the radiated signal.

Notwithstanding the disclosures in the foregoing references, applications for ELF frequencies still use conventional land-based antennas. There remains a requirement for an antenna that can be mast mounted or otherwise use significantly less space than the existing conventional land-based antennas for enabling the transmission of signals at various frequencies, included ELF and other low-frequency signals, for transmission in an underwater environment.

SUMMARY OF THE INVENTION

Accordingly it is an object of the present invention to provide an antenna capable of operation with ELF signals.

Another object of this invention is to provide an antenna that is capable of transmitting signals in different frequency ranges including the ELF range.

Still another object of this invention is to provide an ELF antenna that is transportable.

Yet another object of this invention is to provide an ELF antenna that can be mounted in a restricted volume.

In accordance with this invention, an antenna for operating at a reference frequency radiates a field by repetitively producing a plasma in a confined, vertically extending volume. The plasma has a characteristic relaxation time when the ionizing process ceases. The interval between successive repetitive energizations is less than the characteristic relaxation time.

In accordance with another aspect of this invention, a communications system for operating at a reference frequency includes a high-power laser that generates a laser beam along an axis positioned to be vertically directed into the atmosphere. The laser operates in a pulsed manner to produce a vertical plasma column in the atmosphere. The plasma has a characteristic relaxation time, and the interval between successive pulses applied to the laser is less than the characteristic relaxation time. A modulation signal controls the pattern of the repetitive pulsing and operates at a reference frequency that is less than the pulse repetition frequency for energizing the laser. Alternately exciting and extinguishing the plasma in response to the modulating signal enables a current having alternating directions to be developed in the plasma at the reference frequency.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
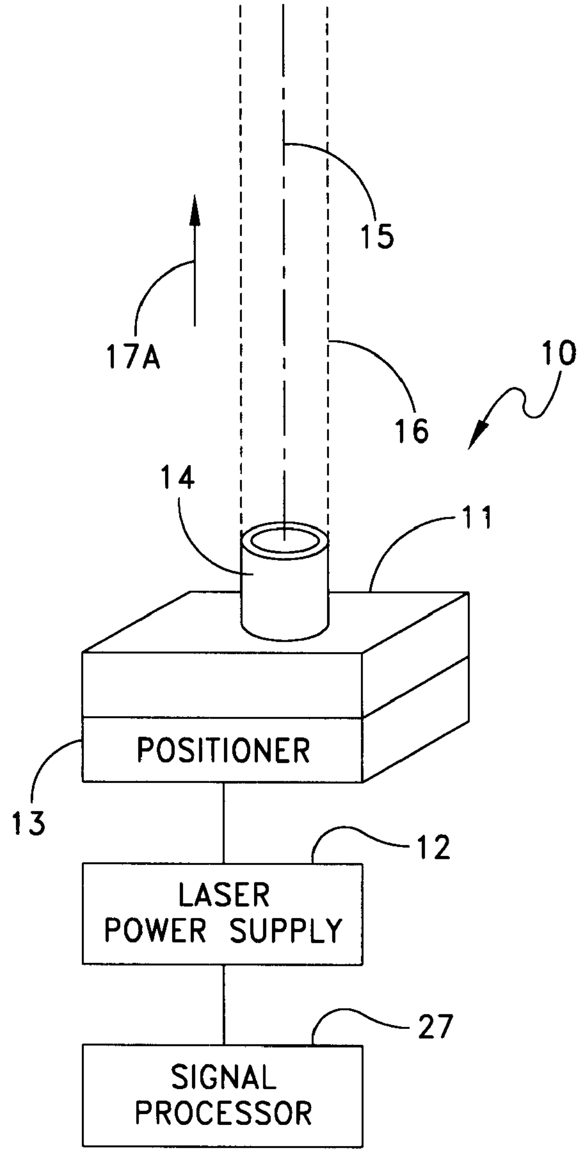
FIG. 1 depicts an embodiment of this invention during one operating mode.
Figure 2:
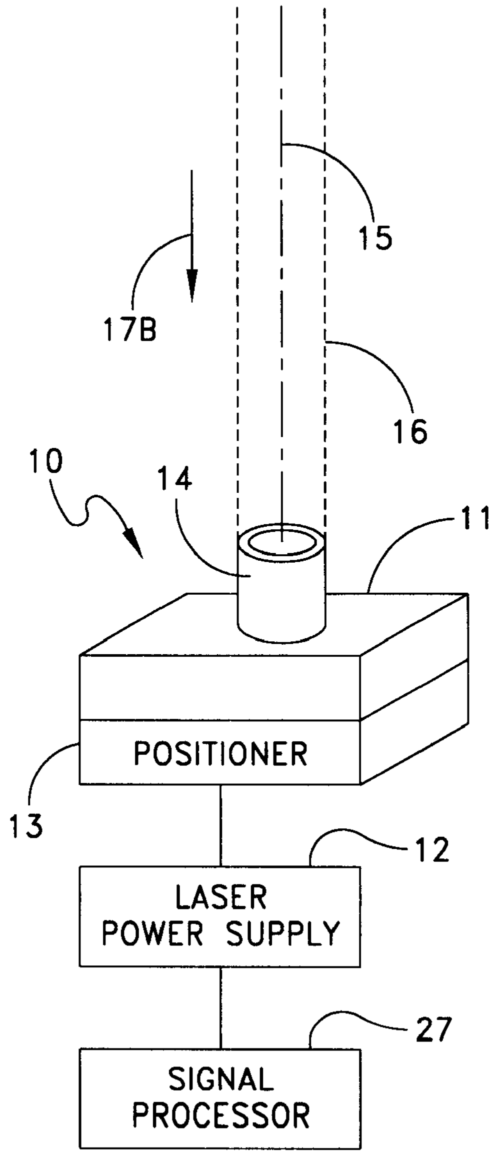
FIG. 2 depicts the antenna system of FIG. 1 in a second mode of operation.

FIGS. 1 and 2 schematically depict a structure that forms an antenna 10 in accordance with this invention. In this particular embodiment the antenna 10 includes a laser 11 operated by a laser power supply 12. A positioner 13 locates the laser 11 so that the emitted laser beam from an output aperture 14 travels along a vertical axis 15 into the atmosphere. When the laser is active, the laser beam interacts with a medium above it to form an unbounded plasma column 16 as known in the art. This plasma column 16 comprises ions and electrons that will produce an upward current in response to an abrupt ionization of the air in the column 16.

Specifically, the abrupt ionization of the air will create a two-fluid plasma (i.e., a plasma comprising ions and electrons) by different density gradients. The current magnitude will be dependent upon the difference in the diffusion times of the electrons and ions in the plasma. Extinguishing the plasma produces a downward current because the electrons and ions have different relaxation times during that process. In FIG. 1, an upward arrow 17A represents the upward current; in FIG. 2, a downward arrow 17B represents the downward current. Consequently, the arrows 17A and 17B in FIGS. 1 and 2 represent two oppositely polarized currents produced at the frequency at which the plasma column 16 is excited and extinguished. Alternatively, the currents 17A and 17B can be considered as currents of opposite direction.

It has been determined that this plasma current, $I_p$, will have a much greater magnitude than the current $I_A$ in a conventional antenna. As previously indicated, conventional ELF antennas have a length $L_A$ that is quite long. In accordance with conventional antenna analysis, two antennas provide equal radiation if they have an equal I*L product where I is the current in the antenna and L is the length of the antenna. Assuming the conventional antenna has a length $L_A$, the length $L_p$ of the plasma antenna will be:

$$L_P = \frac{I_A}{I_P} L_A \tag{1}$$

Thus, if the plasma generates a current $I_p$ that has a greater magnitude than the current $I_A$ of a conventional antenna, the length $L_p$ of the plasma antenna can be decreased by a corresponding amount. For applications in which the plasma column 16 in FIGS. 1 and 2 reaches well into the atmosphere a combination of increased current and length may provide even greater field strengths than presently available in ELF applications. It is expected that the plasma current for a given frequency will be up to 2 to 5 times or more the corresponding antenna current.

The basic criterion for providing such an antenna is that the plasma in the column must have an electron density of at least $10_{12}$ electrons per cubic centimeter. Although it may be possible to provide that level of ionization over time intervals associated with ELF frequencies, such continuous wave devices for use in antennas are prohibitively expensive. Pulse mode lasers offer a better option as ionizers. In FIGS. 1 and 2 the laser 11 comprises a $CO_2$, Nd:YAG or other laser. Typically these lasers operate in a pulse mode with a pulse repetition frequency that is much higher than ELF. For example, a $CO_2$ laser may operate with a pulse repetition frequency (PRF) in the megahertz range; one such $CO_2$ laser, operates at about 67 MHz with a 33% duty cycle.

Figure 3:
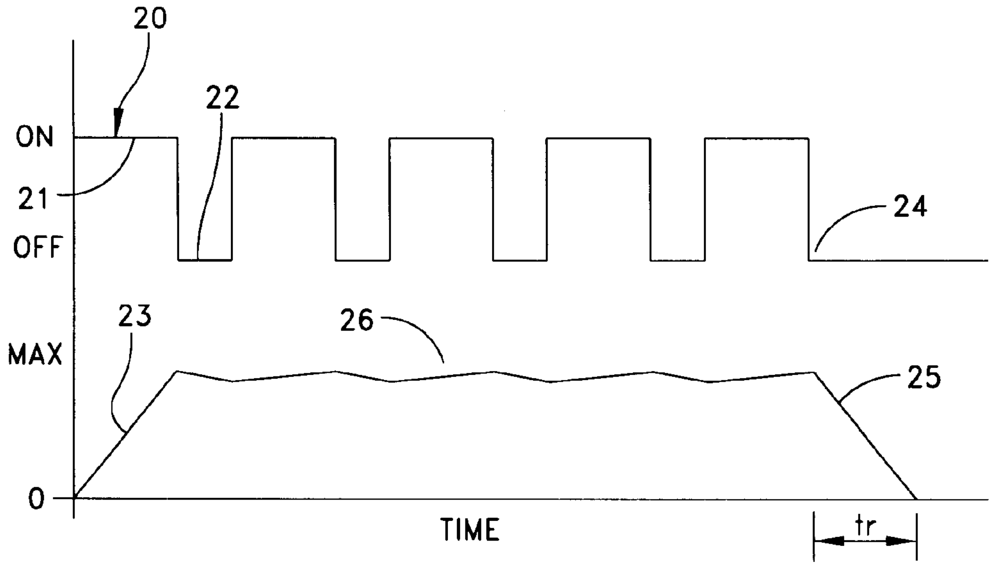
FIG. 3 comprises a set of graphs that are useful in understanding this invention.

When the laser power supply 12 generates a single pulse, the laser beam ionizes the air in the column 16 to form a gas plasma. When the laser beam extinguishes, the plasma extinguishes with a characteristic relaxation time as known in the art. FIG. 3 depicts this action by showing a pulse train 20 at some pulse repetition frequency with the pulse train shifting between an ON level 21 and OFF level 22. With this pulse train, the initial pulse can be considered to fully ionize the air in a column. A straight, sloped line 23 extending from a zero ionization level to a maximum (MAX) ionization level depicts this interaction. The straight line 23 represents a first order approximation of the relationship between level and time; the actual relationship is nonlinear. The details of this relationship are not necessary to an understanding of this invention.

After the pulses terminate at 24 in FIG. 3, the plasma goes through its relaxation and recombination and then extinguishes. The time for this relaxation and recombination is depicted as a straight line 25 that also is a first order approximation of the actual change in ionization over that time, represented as an interval $t_r$.

The OFF time 22, between successive pulses in the pulse train 20 is selected to limit the amount of relaxation between successive pulses. For example, the interval is chosen to limit the relaxation to about 10% of the maximum ionization. The OFF time 22 is then selected so that succeeding pulse at the PRF energizes the laser 12 before the ionization relaxes to that reduced level. A portion 26 of the ionization graph in FIG. 3 extending between the rise and relaxation lines 23 and 25, shows the effect of repetitive pulses having an OFF time corresponding to above criterion. Although there is a minor variation in the ionization level in the column during successive pulses, that variation is less than about 10% of the maximum ionization. Therefore, the variation is insignificant with respect to the operation of this invention.

In FIG. 3, it is assumed that ionization reaches a maximum during a single laser pulse; that is, the first pulse in a series of pulses. In certain applications full ionization may be achieved only after multiple pulses. Again, however, the time involved in reaching full ionization will be insignificant in the time domain of ELF and other like signals. That is, in the domain of the low frequency signals, the full ionization will be achieved instantaneously.

Figure 4:
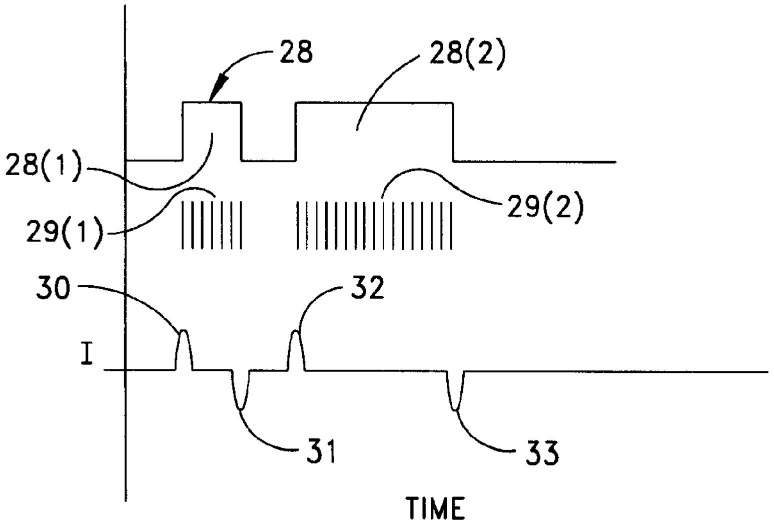
FIG. 4 represents another set of graphs that are useful in understanding this invention.

FIGS. 1 and 2 also depict a signal processor 27 that controls the energy radiated from the antenna 10 during a transmitting mode. The signal processor 27 can produce a modulating signal of the well known ASK, FSK or FM variety at a reference frequency. In the case of ELF applications, the reference frequency might be 100 Hz. FIG. 4 depicts an ASK modulating signal 28 generated by the signal processor 2.7 for the letter "A" in Morse code. A first pulse 28(1) turns on the laser power supply 12 to produce a pulse train 29(1) of a corresponding "dot" duration. As previously indicated, a net upward current will be generated due to the different diffusion coefficients of ions and electrons during the abrupt ionization of the column 16 in FIG. 1. The trailing edge of the pulse 28(1) will terminate the pulse train 29(1) allowing the ionization to terminate. The different relaxation times of electrons and ions under this condition, generate the downward current. Thus, in FIG. 4 the leading edge of the pulse 28(1) produces a positive current pulse 30; the trailing edge, a negative going pulse 31 thereby producing an alternating cycle.

Likewise, an elongated pulse 28(2) representing the "dash" of the letter "A" energizes the laser power supply 12 to produce an elongated pulse train 29(2). As a result an upward current pulse 32 is generated with the onset of the ionization of the leading edge of the pulse 28(2) while the corresponding negative going pulse 33 is generated at the trailing edge of the pulse 28(2).

These current pulses generate an electric field that radiates from the antenna 10. In this embodiment, the ELF signal has the form of a series of oppositely poled pulses having a time duration dependent upon the ON time of the modulating signal 28.

As will be apparent, if the signal processor 27 generates a fixed-width pulse having two different frequencies, the antenna 10 can radiate an FSK signal. Alternatively, if the signal processor 27 can generate a frequency-modulated signal, the antenna 10 can radiate a frequency-modulated signal. FKS and FM modulating signals typically are more effective at higher frequencies.

Figure 5:
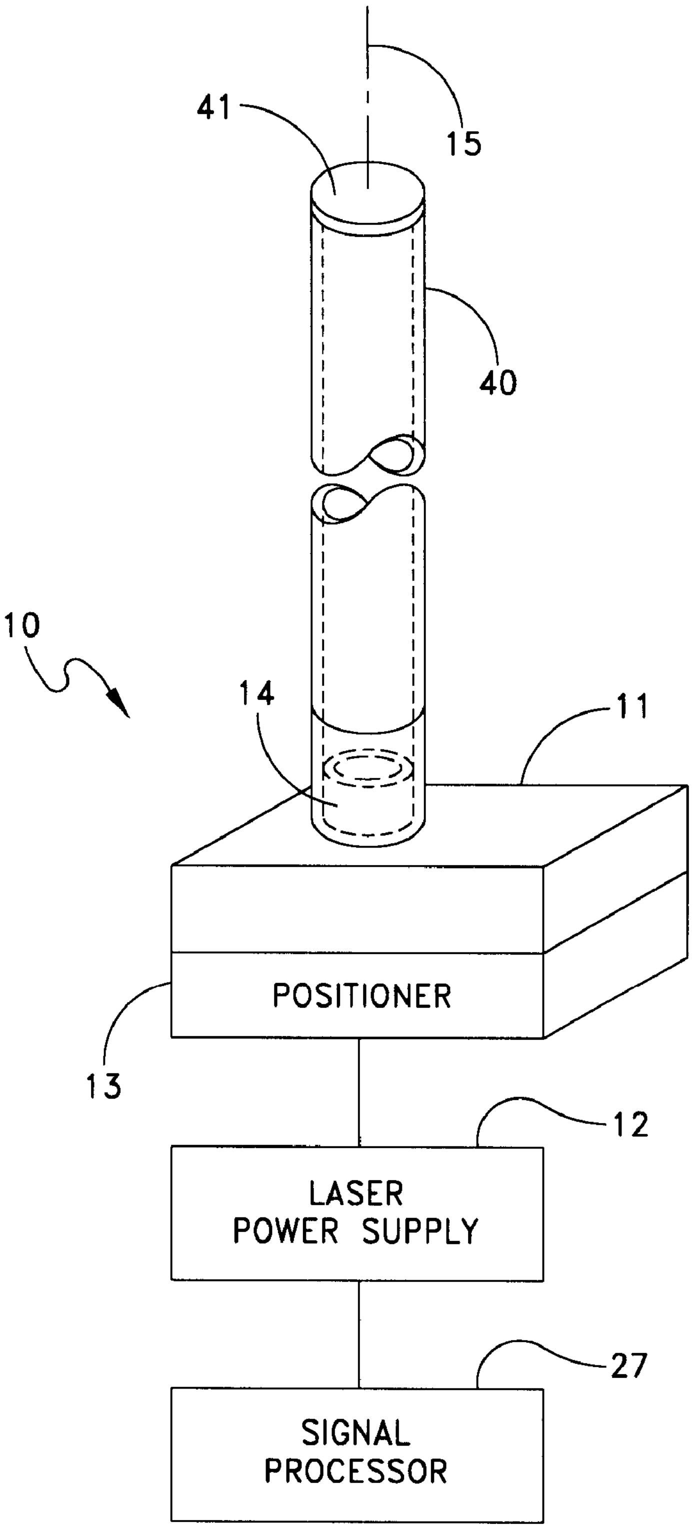
FIG. 5 depicts another embodiment of an antenna constructed in accordance with this invention.

Although the foregoing description has been in terms of communications in the ELF range, the general principles of this invention are equally applicable to signals in the kHz and MHz ranges. At such higher reference frequencies, an antenna 10 constructed in accordance with this invention, still has the same basic structure as depicted in FIGS. 1 and 2; but may include a bounded plasma column. Specifically, in FIG. 5 the antenna 10 includes a laser 11 that directs a laser beam out an aperture 14 along an axis 15 into the atmosphere. The positioner 13 locates the axis 15. The laser power supply 12 generates pulses modulated in accordance with the signal from the signal processor 27 as previously described.

At these higher frequencies, however, the length of the plasma column can be reduced over that required for ELF signals. Dependent upon space constraints, at some higher frequency it will be possible to construct the antenna 10 with a tube 40 of a ceramic, glass or like material that defines a bounded volume along the axis 15 in which the ionization will occur. This tube can include an end cap 41 to provide a closed bounded column. The use of such a column can improve the efficiency of ionization and increase the current produced by the changes in ionization. Further, the tube 40 isolates the ionization column from any environmental influences, such as wind.

Therefore there has been disclosed in the foregoing figures an antenna in which an ionizing mechanism, such as a laser, produces a plasma column that is periodically excited and extinguished. The resulting differential rates of diffusion and relaxation of the ions and electrons within the plasma produce current pulses of opposite direction at the beginning and the end of each ionization cycle. These currents then produce an electric field that is radiated. As the only hardware associated with the antenna includes the laser, laser power supply, and signal processor, this construction provides a compact, transportable antenna structure even for ELF applications. As the radiated field is generated by the plasma itself, there is no need for gas discharge mechanisms located in the ion beam as in the prior art devices. Moreover, this invention enables the construction of an antenna that is significantly shorter than a conventional antenna for the same frequency.

This invention has been described in terms of specific implementations. Different lasers or ionization sources, different laser power supply operations and different signal processor operations can all be incorporated in a plasma antenna that relies upon the different diffusion and relaxation rates for ions and electrons in the plasma. Therefore, it is the intent of the appended claims to cover all such variations and modifications as come within the true spirit and scope of this invention.

What is claimed is:

1. An antenna comprising:

ionization means for producing, when energized, a plasma in a volume extending upward along a vertical axis, said ionization means including means for generating in at least a portion thereof of the plasma an ionization of at least $10^{12}$ electrons per cubic centimeter during excitation and the plasma having a characteristic relaxation time when said ionization means is de-energized; and energizing means for repetitively energizing said ionization means such that the interval between successive energizations is less than the characteristic relaxation time.

2. An antenna as recited in claim 1 wherein said ionization means comprises a high-power laser.

3. An antenna as recited in claim 1 additionally comprising means for modulating the operation of said energizing means in response to a modulating signal whereby the difference in the diffusion coefficients of ions and electrons in the plasma generate an alternating current in the plasma that corresponds to the modulating signal.

4. An antenna as recited in claim 1 for operation at high frequencies wherein said ionization means includes means for defining a bounded volume having a vertical axis.

5. A communications system for operating at a reference frequency comprising:

a high-power laser that generates a laser beam along a laser axis;

means for locating said laser with the laser axis in a vertical orientation directed into the atmosphere;

energizing means for operating the laser in a pulsed manner thereby to produce a vertical plasma column in the atmosphere wherein the plasma has a characteristic relaxation time and the interval between successive pulses is less than the characteristic relaxation time; and modulation means responsive to a modulating signal for controlling the operation of said energizing means at a reference frequency that is less than the pulse repetition frequency of said energization means whereby alternately exciting and extinguishing the plasma produces an alternating current within the plasma at the reference frequency in response to the modulating signal.

6. A communications system as recited in claim 5 additionally comprising means for defining a bounded volume for the plasma produced by the laser beam.

7. A communications system as recited in claim 5 wherein said laser is taken from the group of lasers capable of producing an ionization level of at least $10^{12}$ electrons per cubic centimeter in at least a portion of the column.

8. A method for providing an antenna comprising:

ionizing a volume extending upward to produce a plasma with ions and electrons characterized by different relaxation times upon termination of ionization; and controlling said ionizing to produce repeated ionizations in the column such that the interval between successive ionizations is less than the characteristic relaxation whereby the ions and electrons produce a current during the interval between repeated ionizations wherein said repetitive ionizing steps produce an ionization of at least $10^{12}$ electrons per cubic centimeter in at least a portion of the ion plasma.

9. A method for as recited in claim 8 wherein said repetitive ionizing steps include repetitively energizing a high-power laser for producing an ionization of at least $10^{12}$ electrons per cubic centimeter in at least a portion of the ion plasma.

10. A method as recited in claim 8 additionally comprising the step of modulating the operation of said energizing means in response to a modulating signal whereby the difference in the diffusion coefficients of ions and electrons in the plasma generate an alternating current in the plasma that corresponds to the modulating signal.

11. A method for as recited in claim 8 for providing an antenna operable at high frequencies including the step of confining the plasma to a bounded volume having a vertical axis.

12. A method as recited in claim 8 further comprising:

locating a high-power laser that generates a laser beam along a laser axis in a vertical orientation directed into the atmosphere;

energizing the laser in a pulsed manner thereby to produce a vertical plasma column in the atmosphere wherein the plasma has a characteristic relaxation time and the interval between successive pulses is less than the characteristic relaxation time;

generating a modulating signal; and modulating the energization of the laser at a reference frequency that is less than the pulse repetition frequency whereby alternately exciting and extinguishing the plasma produces an alternating current within the plasma at the reference frequency in response to the modulating signal.

13. A method as recited in claim 12 additionally comprising the step of defining a bound volume for the plasma produced by the laser beam.

14. A method as recited in claim 12 wherein said laser is taken from the group of lasers capable of producing an ionization level of at least $10^{12}$ electrons per cubic centimeter in at least a portion of the column.

* * * * *